United States Patent
Blount

(10) Patent No.: US 9,830,107 B2
(45) Date of Patent: Nov. 28, 2017

(54) DRIVE WEAR-OUT PREDICTION BASED ON WORKLOAD AND RISK TOLERANCE

(71) Applicant: NetApp, Inc., Sunnyvale, CA (US)

(72) Inventor: Joseph Blount, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 104 days.

(21) Appl. No.: 15/142,923

(22) Filed: Apr. 29, 2016

(65) Prior Publication Data

US 2017/0315753 A1 Nov. 2, 2017

(51) Int. Cl.
*G06F 3/06* (2006.01)

(52) U.S. Cl.
CPC .......... *G06F 3/0649* (2013.01); *G06F 3/0616* (2013.01); *G06F 3/0644* (2013.01); *G06F 3/0679* (2013.01)

(58) Field of Classification Search
CPC .... G06F 3/0616; G06F 3/0617; G06F 3/0644; G06F 3/0649; G06F 3/0653; G06F 3/0679; G06F 3/0688
USPC ........................ 711/103; 714/47.1, 47.2, 47.3
See application file for complete search history.

(56) References Cited

U.S. PATENT DOCUMENTS

| | | | |
|---|---|---|---|
| 8,880,962 B2* | 11/2014 | Hosking | G06Q 10/109 |
| | | | 714/47.3 |
| 2017/0017557 A1* | 1/2017 | Oshima | G06F 11/2094 |
| 2017/0207981 A1* | 7/2017 | Maguire | H04L 41/147 |
| 2017/0269980 A1* | 9/2017 | Gupta | G06F 11/076 |

* cited by examiner

*Primary Examiner* — Gary Portka
(74) *Attorney, Agent, or Firm* — Haynes and Boone, LLP

(57) ABSTRACT

A system and method for optimizing the estimation and management of wear and replacement for an array of storage devices in a storage system is disclosed. An input/output workload is monitored over part of a service period for the array. An expected wear rate is determined, based on the workload and an endurance of the storage devices. A target wear rate is calculated for the service period and each of one or more contingency periods, based on the expected wear rate and a specified risk tolerance for each period. In response to determining that the expected wear rate exceeds the target wear rate calculated for at least one of the service period and the contingency period(s), an adjusted wear rate is calculated for the array of storage devices to match the target wear rate. A replacement schedule is generated for the array based on the adjusted wear rate.

20 Claims, 8 Drawing Sheets

500A

| Period | System Level Target |
|---|---|
| Service | 2% drive failures/mo |
| Workload Change | 2.5% drive failures/mo |
| 1st Extended Period | 5% drive failures/mo |
| 2nd Extended Period | 10% drive failures/mo |

| Period | Replacement Rate | # Of Drives (cluster limit) | Target Wear Rate | Wear Rate On Chart |
|---|---|---|---|---|
| Service | 2%/mo | 0.48 | 0.36 | Peaks @ 0.5 |
| Workload Change | 2.5%/mo | 0.60 | 0.45 | 0.5 |
| 1st Extended Period | 5%/mo | 1.2 | 0.9 | 0.5 |
| 2nd Extended Period | 10%mo | 2.4 | 1.8 | 0.5 |

FIG.5B

DRIVE WEAR-OUT PREDICTION BASED ON WORKLOAD AND RISK TOLERANCE

TECHNICAL FIELD

The present description relates to data storage systems, and more specifically, to techniques for managing wear-out and replacement of storage devices in a storage system.

BACKGROUND

A network storage system typically provides multiple user devices with access to one or more storage devices for recording and retrieving digital information. In conventional network storage systems, a storage server maintains data in a main (persistent) storage subsystem, which may be organized into one or more groups of storage devices, such as hard disk drives (HDDs) or solid-state drives (SSDs). Such drives begin to wear over time and eventually fail, e.g., after some finite number of read/write cycles or total data transfer threshold specified by a drive vendor. As drive wear-out or failure can lead to data loss, there is a risk associated with wear in storage systems. Providers of storage system services generally try to balance their tolerance for such risk with the drive replacement costs expected at the end of each drive's service life.

Historically, storage service providers have relied on using higher quality drives with relatively higher endurance levels and longer service lives to reduce wear-outs and replacement costs over time. However, the endurance of storage media in general is expected to decrease dramatically for some types of media, for reasons such as cost cutting. Consequently, the number of drive wear-outs and replacements are expected to increase. As the industry transitions to a state where drive replacements becomes more frequent, a simplistic approach that relies solely on drive quality or endurance levels might actually lead to increased costs for storage system operators.

BRIEF DESCRIPTION OF THE DRAWINGS

The present disclosure is best understood from the following detailed description when read with the accompanying figures.

FIG. 5A is a table illustrating different types of risk targets for storage device wear-outs or failures during the service period and each of the various contingency periods, according to aspects of the present disclosure.

FIG. 5B is another table illustrating system level risk targets along with different wear rates for the service period and each of the various contingency periods, according to aspects of the present disclosure.

DETAILED DESCRIPTION

Figure 1:
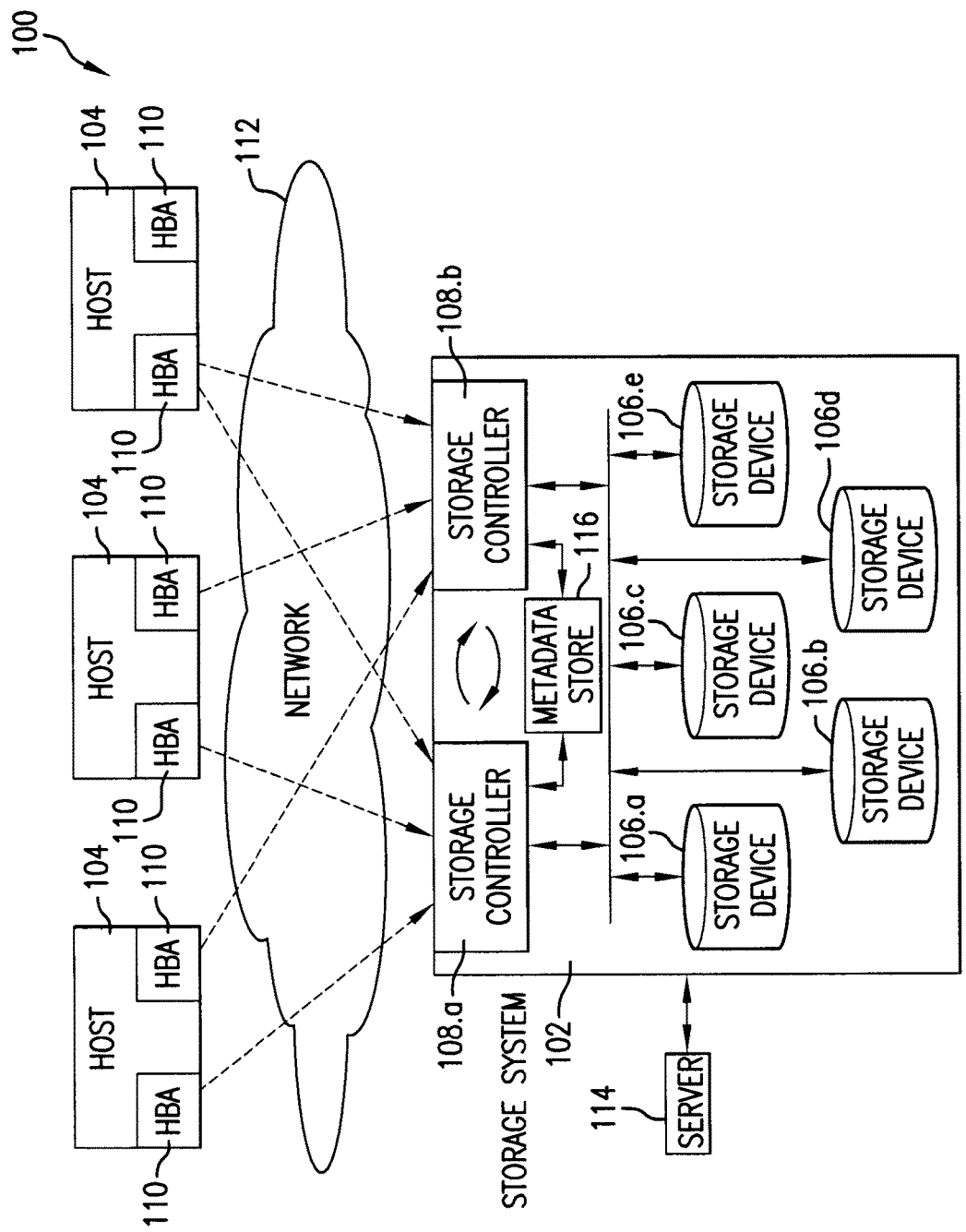
FIG. 1 is an organizational diagram illustrating an example of a data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving wear management for an array of storage devices in a network storage system. In an embodiment, numerical modeling techniques are used to generate an optimal wear-out and replacement schedule for an array of storage devices, given the array's particular configuration, its input/output (I/O) workload, media characteristics, and a specified risk tolerance for wear. In one example, a storage controller of the storage system measures or monitors the I/O workload of the array of storage devices over a period of time. The I/O workload may include I/O operations initiated by one or more hosts for writing and reading data to and from the storage devices in the array. The I/O workload may also include I/O operations associated with garbage collection in the array of storage devices. The storage controller may use the total I/O workload, including host-initiated I/O and garbage collection I/O operations, to determine a wear rate expected for the array of storage devices over a remaining service life of the array. However, it should be appreciated that the disclosed wear estimation and management techniques are not intended to be limited thereto and that these techniques may be applied to any type of wear-inducing activity associated with the array of storage devices. For example, the total I/O workload may further include other types of I/O operations, such as those associated with reconstruction or rebuilding of the data stored within the array due to some unexpected failure. The wear rate may represent, for example, a total consumption of the array's remaining service life as a result of all such wear-inducing activities or operations over time.

Initially, the remaining service life may correspond to a remaining portion of a service period associated with the array of storage devices. The service period may be based on, for example, a warranty period designated for the storage devices in the array by a device manufacturer or vendor. However, limiting the array's remaining service life and expected wear rate to such a service period may not provide an accurate representation of the actual wear that the array of storage devices would incur over the remaining service life. In an embodiment, the total distribution of wear expected over the array's remaining service life is expanded to include one or more contingency periods after the service period. For example, the addition of such contingency periods may extend the expected wear rate of the array of storage devices past the service period to a terminal state of the array at an end of the array's remaining service life.

As will be described in further detail below, the one or more contingency periods may be used to address the vulnerability of the expected wear rate (or initial wear rate estimation) to potential calculation and measurement errors as well as any incorrect assumptions that may have been made with respect to the workload or particular storage device configuration. Such errors may be due to various contingencies that may affect the rate and distribution of wear over the remaining service life of the storage devices in the array. Examples of such contingencies may include, but are not limited to, significant changes in the array's I/O workload, device failures that occur well before the designated warranty or service period expires, and any other events of concern that may impact the wear rate and/or remaining service life of the storage devices in the array. In other words, the contingency periods may act as risk guard bands.

In an embodiment, a target wear rate may be used to limit the risk of significant changes to the expected wear rate as a result of such errors or contingencies during different periods of time over the array's remaining service life. For example, the target wear rate may be calculated for a remaining portion of the service period and each of the one or more contingency periods, based on the expected wear rate that was initially determined for the array and a specified risk tolerance (or "risk target") for each period.

Further, the target wear rate may be used to generate an optimal wear-out schedule that provides an optimal or target replacement rate for each of the different time periods over the array's remaining service life. Such a wear-out and replacement schedule may then be used to make appropriate adjustments to the current configuration of storage devices within the storage system so as to optimize wear management in terms of expected replacement costs and performance considerations within specified risk tolerances. Accordingly, the replacement schedule may be used to plan for and mitigate the risk of significant workload changes due to one or more of the above-described contingencies over the array's remaining service life. Furthermore, the replacement schedule may be used to minimize replacement costs by avoiding unnecessary replacement of storage devices in the array, e.g., during time periods when the I/O workload and wear rate of the array are actually less than what was initially expected. In one example embodiment, data showing target wear rates, expected wear rates, contingency periods, and replacement schedules may be displayed to a human user as part of a configuration graphical user interface or other application.

FIG. 1 illustrates a data storage architecture 100 in which various embodiments may be implemented. Specifically, and as explained in more detail below, one or both of the storage controllers 108.a and 108.b read and execute computer readable code to calculate and adjust wear rates.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions from one or more of the hosts 104 via a communication network 112. Such transactions may be, for example, requests to write and/or read data from one or more storage devices 106. Accordingly, the storage system 102 may take an appropriate action, for example, reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the controllers 108, each of the hosts 104, and the server 114 are shown in FIG. 1 as singular entities, such systems may include any number of computing devices ranging from a single computing system to a system cluster of any size. Accordingly, each storage controller 108, host 104, and server 114 includes at least one computing system, which in turn includes a processor such as a microcontroller or a central processing unit (CPU) operable to perform various computing instructions. The instructions, when executed by the processor, may cause the processor to perform various operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as a random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

As shown in the example of FIG. 1, the exemplary storage system 102 includes an array of storage devices 106, including storage devices 106.a, 106.b, 106.c, 106.d, and 106.e. While only five storage devices are shown in FIG. 1, it should be appreciated that embodiments are not intended to be limited thereto and that any number of storage devices may be used as desired for a particular implementation. The storage system 102 responds to one or more hosts 104's data transactions or data I/O requests so that the storage devices 106 may appear to be directly connected (or local) to the hosts 104. In various examples, the storage devices 106 include various hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance and/or endurance levels.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In addition, the storage system 102 may also include a metadata store 116. The metadata store 116 may be composed of one or more storage devices, such as one or more SSDs. The metadata store 116 may serve to store metadata regarding data (e.g., written from one or more hosts 104) in the storage devices 106. In an embodiment, write data may be received from one or more hosts 104 and momentarily stored in a write-back cache of the storage system 102, e.g. using LBAs. The metadata store 116 may house one or more types of metadata to facilitate translating the specified LBAs of the data in the write-back cache to block addresses used by the storage devices 106.

In some implementations, the metadata store 116 may include a data structure that facilitates translation of a specified volume/LBA block addresses (the physical locations) used for the storage devices 106. The different information destined for the metadata store 116 may be addressed into the metadata store 116 with metadata block addresses associated with metadata objects. When a new version of data already stored in one or more of the storage devices 106 is received at the storage system 102 for storage, that data may be written to a new segment, e.g., where the data is currently being sequentially written in accordance with embodiments of the present disclosure. As a result, the old mapping in the data structure may be removed, and the reference count for the block address where the data is stored in the storage devices 106 may be decremented.

In an embodiment, the metadata store 116 may also include information related to a workload of I/O operations for the storage devices 106. For example, the storage controllers 108.a and/or 108.b may monitor or measure an I/O workload of the storage devices 106 over an initial portion of a service period of the storage devices 106. The service period may be, for example, a warranty period designated by a manufacturer or vendor for the storage devices 106, or storage system 102, as described above.

The monitored I/O workload may include I/O operations which cause wear on the storage devices 106, initiated by one or more of the hosts 104, e.g., read and/or write operations. If the storage system's architecture requires garbage collection, the monitored I/O workload may also include I/O operations associated with garbage collection and other functions or processes performed for the storage devices 106. Garbage collection is performed to free up those locations in storage media that hold invalid data. In garbage collection, segments (which can be formed of one or more data stripes in a pooled storage system) are identified for collection. These segments are typically identified based on the number of invalid chunks of data they contain (e.g., a segment with more invalid chunks of data may be a more likely candidate for garbage collection). In garbage collection, any valid chunks of data in the target segment are read out from the target segment and written to a new data stripe in a new segment (e.g., sequentially with current write data). Therefore, garbage collection includes read operations and write operations that are not necessarily initiated by a host but nevertheless result in wear on the storage devices. It should be appreciated that any wear resulting from such operations may be dependent upon the type of storage media being used in the array. For example, both read and write operations cause wear for HDDs in the array while only write operations cause wear for SSDs in the array.

In the present example, the storage controllers 108.a and 108.b are arranged as a high-availability (HA) pair. In an embodiment, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is shown in FIG. 1 as a singular entity, the server 114 may include any number of computing devices and may range from a single computing system to a system cluster of any size.

In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), e.g., a thinly provisioned volume for a pool of SMR drives. In some implementations, certain configuration actions described with respect to server 114 may be carried out by any one or more of the hosts 104 in FIG. 1 or other computing devices (not shown) without departing from the scope of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

In one example embodiment, each of the storage controllers 108.a and 108.b has at least one processor executing logic to perform the risk-based wear management techniques disclosed herein. As will be described in further detail below, such techniques may be used to generate an optimal wear-out and replacement schedule for a particular configuration of the storage devices 106 given the monitored I/O workload and a specified risk tolerance for potential wear-out or failure over the service life of the storage devices 106. Embodiments of the present disclosure, including the techniques disclosed herein for estimating and managing wear and replacement rates for the array of storage devices 106 in the storage system 102, may be implemented within, for example, a firmware of each of the storage controllers 108.a and 108.b of the storage system 102. For example, one or both of the storage controllers 108.a, 108.b may utilize the disclosed techniques to generate an optimal wear-out and replacement schedule for the array of storage devices 106. As will be described in further detail below with respect to FIGS. 2A-7, such a schedule may be based on the particular configuration and I/O workload characteristics of the storage devices 106 along with one or more risk tolerances (or risk targets) specified for different time periods over the array's remaining service life.

In other embodiments, the techniques for risk-based wear management may be performed by one or more other computing systems, such as server 114 or one or more of the host 104, or even a computer system that is in communication with storage system 102 but is not shown in FIG. 1. In such embodiments, those other devices may request and receive statistics regarding I/O operations and garbage collection operations. For instance, storage devices 106 and controllers 108 may include counters to indicate numbers of read/write/modify operations that are performed. The computing device that performs wear management may request and receive data from those counters and perform calculations based on that data.

FIGS. 2A-7 will be described in the context of an exemplary storage device configuration including an array of 24 relatively low-endurance storage devices, e.g., HDDs, in a storage system (e.g., storage system 102 of FIG. 1, as described above) according to one or more RAID levels. For purposes of discussion and explanation, it will be assumed that each of the storage devices in this example has a service life (or "endurance") of 200 terabytes (TB). The service life or endurance of each storage device represents the total amount of data transfers (or consumption of life) that the device is expected to endure before it reaches a terminal state at the end of its service life and needs to be replaced. In an embodiment, the terminal state for the array of storage devices may coincide with a point in time where an average remaining service life of the array is at a specified threshold, e.g., 20% of the total service life. However, it should be appreciated that embodiments of the present disclosure are not intended to be limited to this particular configuration and that the disclosed embodiments may be applied to any storage device configuration as desired for a particular implementation.

The service life of the array of storage devices in this example may be consumed by data transfers to and from the devices in the array as a result of different types of I/O workloads. In an embodiment, a storage controller (e.g., storage controller 108.a or 108.b of FIG. 1, as described above) of the storage system may measure the data transfer rates for different I/O workloads by monitoring I/O operations associated with each workload over an initial portion of the array's service life. For example, the storage controller may monitor a host I/O workload including I/O operations performed for one or more host devices (e.g., hosts 104 of FIG. 1, as described above). The storage controller may also monitor a garbage collection I/O workload including operations performed for purposes of garbage collection across the storage devices in the array. Such garbage collection I/O operations may be dependent upon the particular type and locality of the host I/O operations for data transfers to and from the storage devices in the array. For example, garbage collection for the array of storage devices may be unnecessary until some time has passed and a number of write operations have been performed for the hosts. It should be appreciated that the disclosed wear management techniques are not intended to be limited to host I/O and garbage collection I/O workloads and that these techniques may be applied to other types of I/O workloads for an array of storage devices.

Figure 2A:
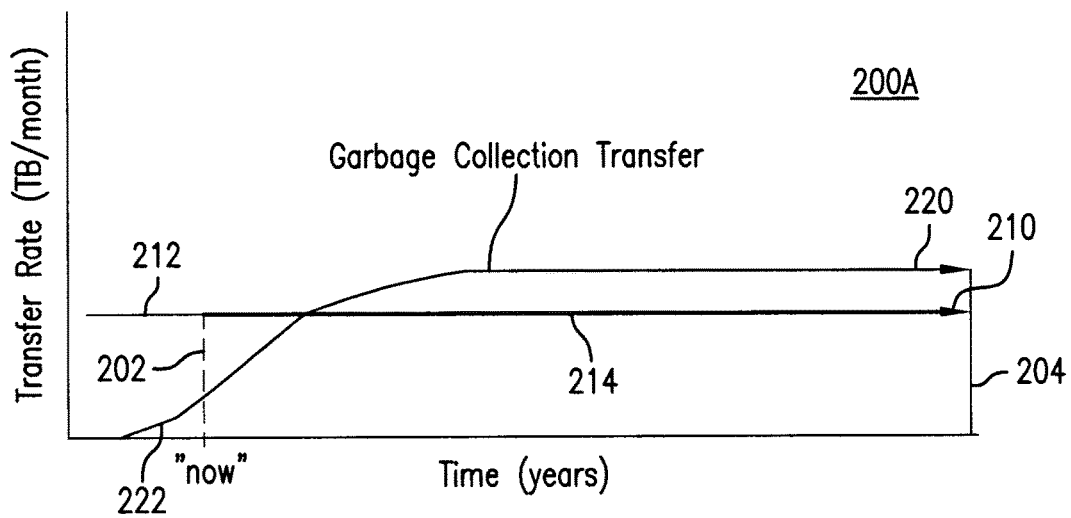
FIG. 2A is a plot graph illustrating a host-initiated input/output (I/O) workload and a garbage collection I/O workload for an array of storage devices over time, according to aspects of the present disclosure.

FIG. 2A is an exemplary plot graph 200A illustrating data transfer rates (e.g., total TBs per month) 210 and 220 for monitored host I/O and garbage collection I/O workloads, respectively, of the storage device array over the array's service life (in years). As shown in FIG. 2A, the array's service life begins at a starting point (e.g., year 0) on a timeline along the x-axis of the plot graph 200A and continues until it reaches an end point corresponding to a terminal state 204 of the storage device array. The host I/O transfer rate 210 may represent a total data transfer rate for all host I/O operations resulting in wear on the storage devices in the array over the array's service life. Depending on the type of storage media, such I/O operations may include both reads and writes (e.g., for HDDs in the array) or only writes (e.g., for SSDs in the array). Likewise, the garbage collection I/O transfer rate 220 may represent the total data transfer rate for all garbage collection I/O operations resulting in wear within the storage device array over the array's service life.

The data transfer rates 210 and 220 in this example may be based in part on actual measurements of I/O operations associated with the monitored host I/O and garbage collection I/O workloads, respectively. The measurements accumulated prior to a current point in time, e.g., prior to the dotted line at a point 202 along the timeline of the array's service life in the plot graph 200A, may be used to analyze current or historical workload trends and associated data transfer rates over an initial portion of the array's service life. The results of the analysis may then be used to estimate or determine the expected workloads for the remaining portion of the array's service life. Thus, a segment 212 of the host I/O transfer rate 210 in the plot graph 200A may represent a current trend for the host I/O transfer rate based on actual measurements accumulated for the storage device array until the current point 202. Likewise, a segment 222 of the garbage collection I/O transfer rate 220 may represent a current trend for the garbage collection I/O transfer rate, also based on the actual measurements accumulated for the array until the current point 202. Further, a segment 214 of the host I/O transfer rate 210 may represent an expected trend for the host I/O transfer rate for the remaining portion of the array's service life based on the currently trending host I/O transfer rate 212. In the example shown in FIG. 2A, it is assumed that the current host I/O transfer rate 212 will continue without change over the remaining portion of the array's service life and therefore, is the same as the expected host I/O transfer rate 214. Also, it is assumed that the garbage collection I/O transfer rate 220 gradually ascends towards a steady state value derived from the trend analysis, which may be based on characteristics of the host workload such as locality, read/write mix, applications in use, etc.

In an embodiment, the storage controller continues to monitor the I/O workloads and accumulate data over the initial portion of the array's service life until a predetermined time period (e.g., 6-12 months) has elapsed since the array of storage devices was first placed into service, i.e., at the beginning of its service life. Additionally or alternatively, the storage controller may monitor the I/O workloads until the storage devices have incurred a predetermined level of wear, e.g., 10-20% wear for one or more of the most frequently used storage devices within the array. Such a wear based approach for monitoring workloads may be preferred, for example, in cases where the array of storage devices is expected to incur a relatively high rate of wear early in its service life, e.g., well before the predetermined time period for monitoring the workload is expected to elapse. Accordingly, the current point 202 along the timeline may represent a time-based and/or wear-based trigger point during the array's service life for performing the above-described workload trend analysis techniques for wear management purposes over the remaining portion of the service life of the array. After the initial evaluation, re-evaluations may be similarly triggered based on time and/or wear.

Figure 2B:
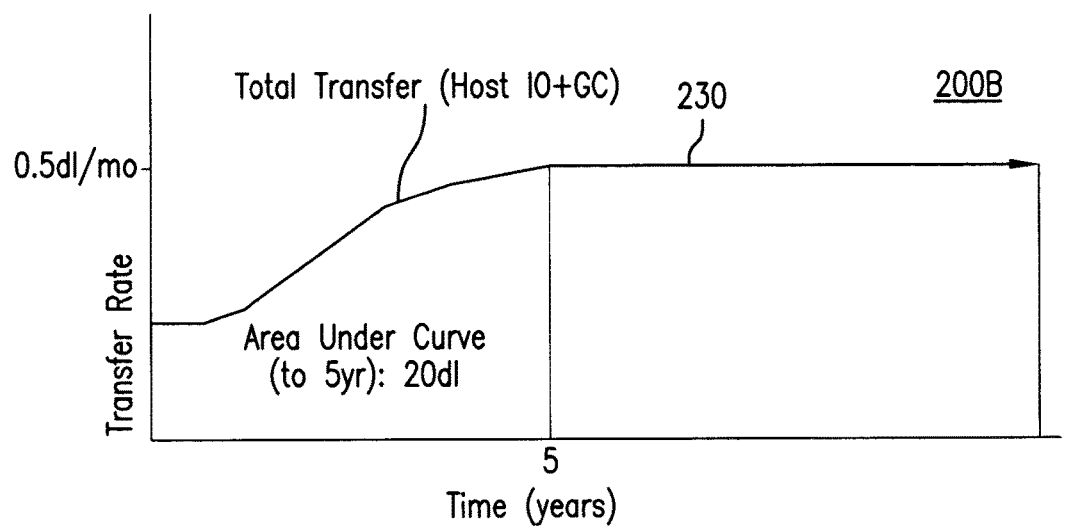
FIG. 2B is another plot graph illustrating an expected wear rate for the array of storage devices over a service period based on the host I/O and garbage collection I/O workloads illustrated in FIG. 2A, according to aspects of the present disclosure.

As the endurance or service life of the storage devices in the array is consumed by the total data transfers to and from the storage devices, the host I/O transfer rate 210 may be combined with the garage collection I/O transfer rate 220 to produce a total transfer rate 230, as illustrated in FIG. 2B. In FIG. 2B, the total transfer rate 230 is illustrated by a plot graph 200B in which the array's service life corresponds to a service period along the timeline axis of the plot graph 200B. As described above, the service period may be a warranty period specified by a manufacturer or vendor of the storage devices in the array or the storage system. For purposes of this example, the service period is assumed to be five years and the total transfer rate 230 is assumed to be 100 TB/month when it reaches steady state.

In an embodiment, the storage controller may determine an expected wear rate for the array of storage devices over the service period, based on the total transfer rate 230 relative to the endurance or service life of the storage devices in the array. As noted previously, it is assumed that the 24 storage devices in this example are storage drives, e.g., HDDs, having a total endurance or service life of 200 TB of data transfers. Thus, the wear rate for the array of storage devices in this example is 0.5 "drive lives" (or "dl") per month (i.e., the 100 TB/month total transfer rate divided by the 200 TB drive life). As shown in FIG. 2B, the value of the expected wear rate at the end of the service period may correspond to a point in the plot graph 200B at which the total transfer rate 230 reaches steady state. For purposes of this example, the total transfer rate 230 may also be referred to as the expected wear rate (or simply, "wear rate") 230. As shown in FIG. 2B, the array of storage drives in this example is expected to consume a total of 20 "drive lives" of endurance over its five-year service period. This value is based on the area under the curve.

However, the plot graph 200B as shown in FIG. 2B is based on various assumptions that fail to account for possible variations to the storage device configuration and workload characteristics over the remaining service life of the array, which may or may not correspond to the service period. Such variations may lead to potential errors and changes to the distribution of the expected wear and the number of any replacements that may be needed over the service period. Accordingly, the disclosed wear management techniques may include padding for such errors and contingencies that may arise over the remaining service life of the array.

Figure 3A:
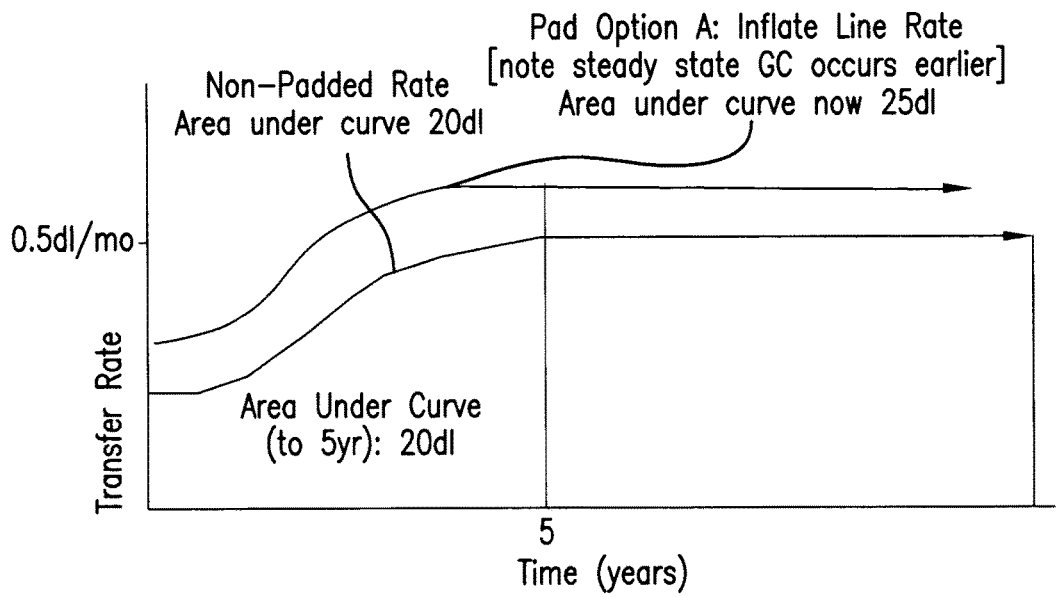
FIGS. 3A and 3B are plot graphs illustrating different padding options to account for calculation errors due to contingencies affecting the expected wear rate for the array of storage devices, according to aspects of the present disclosure.
Figure 3B:
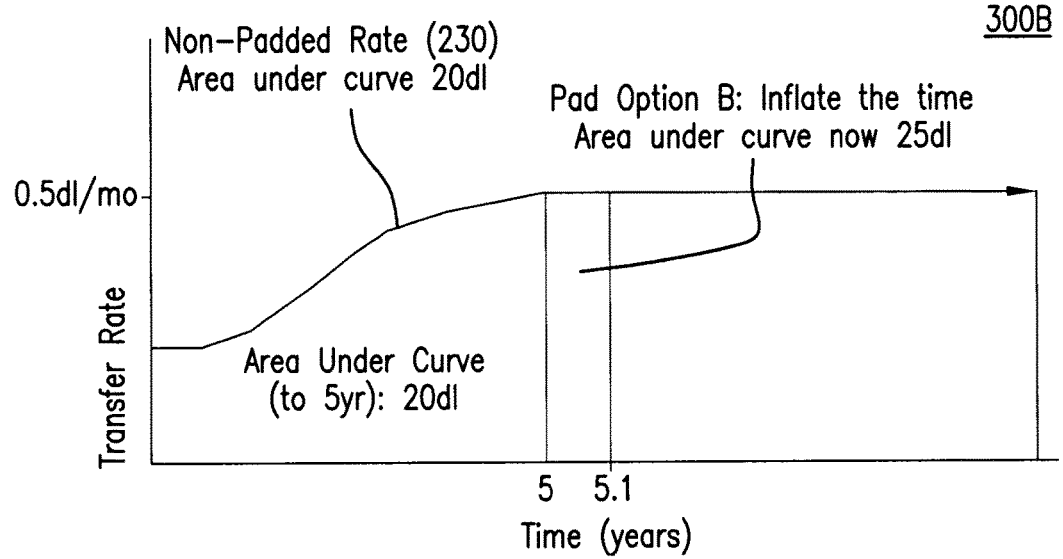

FIGS. 3A and 3B are plot graphs 300A and 300B illustrating different padding options to account for calculation errors due to such errors and contingencies affecting the expected wear rate for the array of storage devices, according to aspects of the present disclosure. The plot graph 300A in FIG. 3A presents a first padding option in which the height of the wear rate curve is inflated along the y-axis such that the total wear that is expected to be incurred (or "total incurred wear") over the five-year service period is increased so as to cover additional wear due to the contingencies described above.

Alternatively, the plot graph 300B in FIG. 3B presents another padding option in which the timeline along the x-axis is inflated beyond the five-year service period mark to achieve the same result, i.e., to increase the total incurred wear as represented by the area under the wear rate curve. As shown in FIG. 3B, a region of the plot graph 300B prior to the five-year service period mark represents the non-padded wear rate 230 as in the plot graph 200B of FIG. 2B as described above. A region of the plot graph 300B after the service period represents the padded wear rate. In contrast with the padding option of FIG. 3A, the padding option in FIG. 3B provides an easier way to distinguish between the expected wear rate based on prior assumptions and possible changes to the expected wear rate based on possible errors or contingencies that may occur over the array's remaining service life as described above. Therefore, this padding option will be used to describe the examples provided in FIGS. 4-7 below.

Figure 4:
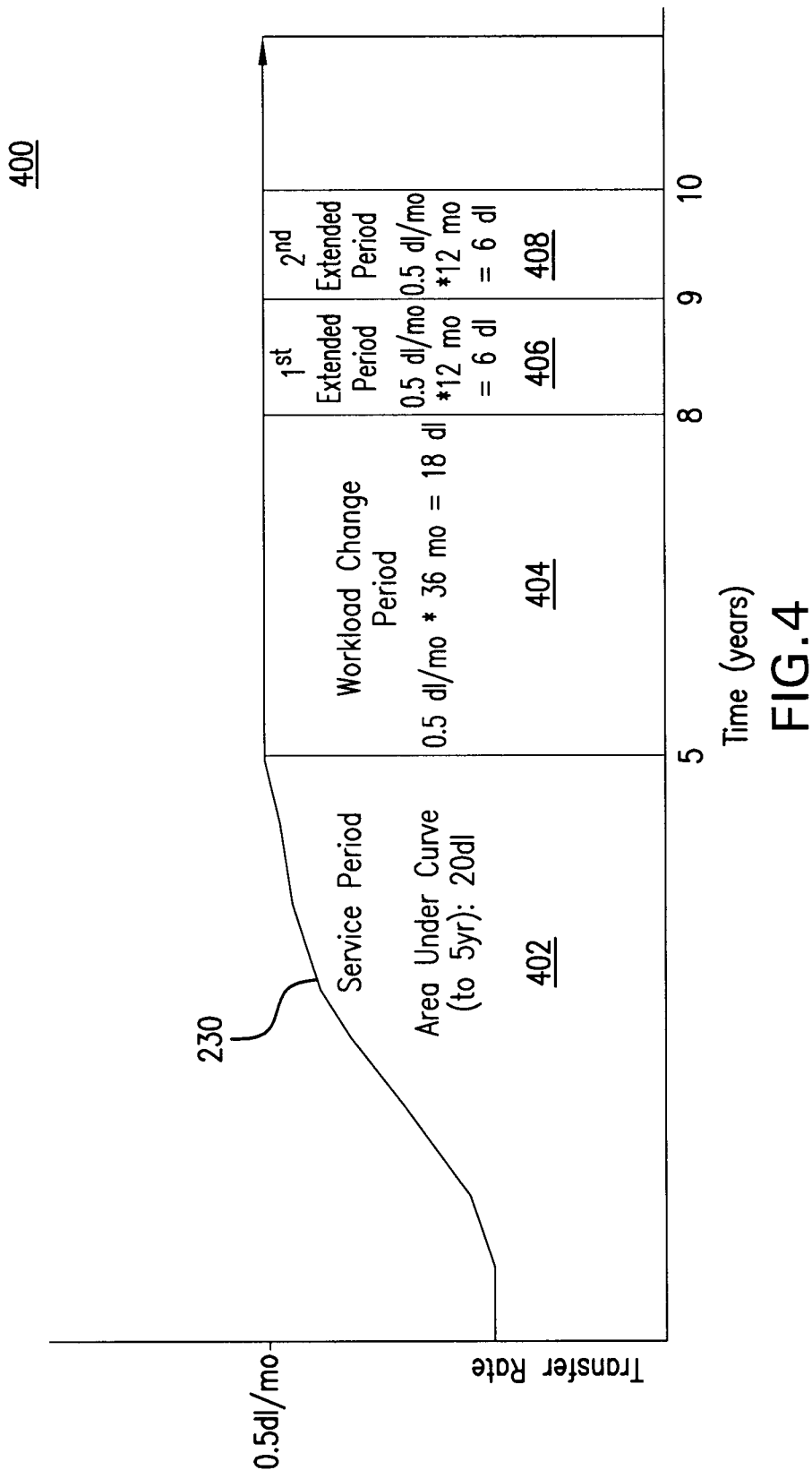
FIG. 4 is a plot graph illustrating the expected wear rate for the array of storage devices over the service period and each of the various contingency periods following the service period, according to aspects of the present disclosure.

FIG. 4 is a plot graph 400 illustrating the wear rate 230 and total consumption of service life (in total drive lives) expected for the array of storage devices over the service period and each of various contingency periods following the service period, according to aspects of the present disclosure. As shown in FIG. 4, the contingency periods added after a service period 402 include a workload change period 404, a first extended period 406, and a second extended period 408. The contingency periods 404, 406, and 408 extend the expected wear rate of the array of storage devices past the service period 402 to a terminal state at an end of the array's remaining service life.

In an embodiment, the service period 402 and each of the contingency periods 404, 406, and 408 may be associated with a specified risk tolerance for changes in the wear rate and associated costs that may be expected as a result. For example, the expected costs for drive wear-out or wear-induced failures may be expressed in terms of costs of replacing the storage devices in the array. The specified risk tolerance or risk target for each of the contingency periods may be used to address the vulnerability of the expected wear rate to various types of contingencies and errors. In some embodiments, a human user may use a graphical user interface or other tool to specify risk tolerance and risk targets for particular risks of each contingency period.

The workload change period 404 may be used to account for the vulnerability of the expected wear rate to changes in the expected workload level for the array of storage devices. The duration or length of the workload change period 404 may be a function of the time remaining in the service period and the degree to which the expected workload may change, e.g., based on the current or historical workload relative to a maximum workload capacity of the storage system, as expressed by Equation (1) below:

$$\text{Period Length} = (\text{service time left}) * \left(\frac{SLA}{historicalLoad} - 1\right) \quad (1)$$

In an embodiment, the system's maximum workload capacity (or maximum allowable capacity) may be based on a service-level agreement (SLA) between a storage system operator and one or more hosts (e.g., hosts 104 of FIG. 1, as described above). Alternatively, the maximum workload capacity may be based on a maximum performance limit of the storage devices in the array. Thus, the workload change period 404 may be used to account for the risk that a historical workload that is not already at maximum system capacity might reach that capacity at some point over the array's remaining service life. For purposes of the example shown in FIG. 4, it is assumed that the historical workload is equivalent to 57% of the maximum workload capacity of the system (i.e., 0.57*SLA). Thus, if we assume that the remaining service time left in this example is 4 years, the duration of the workload change period 404 in this example is equivalent to 3 years as shown in FIG. 4.

In a further example, if the historical workload at 3 years into a 5 year service period is at 10% and 95% of the maximum SLA capacity, the duration of the workload change period may be calculated according to Equations (2) and (3), respectively, as follows:

$$2 \text{ years} * \left(\left(\frac{SLA}{.1 \, SLA}\right) - 1\right) = 18 \text{ years} \quad (2)$$

$$2 \text{ years} * \left(\left(\frac{SLA}{.95 \, SLA}\right) - 1\right) = 0.11 \text{ years} \quad (3)$$

In an embodiment, the first extended period 406 may be used to cover any potential errors that may have been missed. Such errors may include measurement errors, calculation errors, incorrect assumptions, etc. Conceptually, the first extended period 406 may be set to any duration that is necessary to address any lingering concerns that may affect the rate and/or distribution of wear over the array's remaining service life. In an embodiment, the duration of the first extended period 406 is a function of the service time left and a specified fear factor, as expressed by Equation (4) as follows:

$$\text{Period Length} = (\text{service time left}) * (\text{fearFactor}) \quad (4)$$

For example, if the service time left is 4 years as in the above example and the fear factor is set to 0.25, the duration of the first extended period 406 may be calculated according to Equation (5) as follows:

$$4 \text{ years} * 0.25 = 1 \text{ years} \quad (5)$$

A human user may set the fear factor based on tolerance for risk. In this example, the fear factor acts as a weight in Equation 4. Thus, the duration of the first extended period 406 may be reduced as the need for such a catch-all pad for error diminishes.

In an embodiment, the second extended period 408 may be used to account for any variability in the actual time of failure for one or more drives in the storage array in this example. For example, the expected endurance life of storage devices 106 is only an estimation and actual drive wear-outs or failures tend to have a normal distribution, i.e., in the form of a bell curve. Thus, if all the drives in the system were allowed to have a predicted failure at a point shortly after the service period, the second extended period 408 may be used to account for any "bleed-over" of the actual failures that would occur in a bell curve around that point.

As the danger of such bleed-over may never diminish, the second extended period 408 may be set to a fixed duration or length (e.g., one year). However, it should be appreciated that the length of this period may be set to any duration as desired for a particular implementation. The risk tolerance for this period may generally be set to a level that is low enough to make bleed over a negligible concern. Suck a low risk tolerance therefore implies that the specified risk tolerance or target wear rate for limiting the risk level may be much higher than the target wear rate associated with other contingency periods, as will be described in further detail below.

In an embodiment, a target wear rate or risk target for the array of storage devices may be calculated for the remaining portion of the service period 402 (i.e., service time left) and each of the contingency periods 404, 406, and 408, based on the expected wear rate and the specified risk tolerance for each period. In an embodiment, the one or more contingency periods 404, 406, and 408 may be arranged after the service period in order of ascending risk.

FIG. 5A is a table 500A listing examples of different system level risk targets for the wear rate associated with the service period and each of the various contingency periods. The system level risk targets in table 500A may represent risk tolerances or limits on the wear rate for each of these periods. The values in table 500A may be specified by, for example, a human user via a graphical user interface, e.g., provided by the storage controller 108 or server 114 of FIG. 1, as described above, or may be specified in an SLA, or other source. As actual drive failures tend to cluster together, a maximum size limit for such clusters (in number of drives) may be specified for each of the risk targets in table 500A, as shown in FIG. 5B.

FIG. 5B is a table 500B illustrating the target replacement rates, cluster size limits, and target wear rates for the service period and each of the various contingency periods, for the previously described example system containing 24 drives. In an embodiment, the replacement rate for the storage devices in the array may be set to the wear rate for the devices. Thus, the target replacement rate as shown in table 500B may be set to the system level risk targets for wear from table 500A of FIG. 5A. The values of the cluster limits in table 500B may be calculated by multiplying the target replacement rate by the number of drives in the system (e.g. 2%/mo*24 drives in system=0.48 drive replacements per month). In an embodiment, the target wear rate in table 500B may be determined for the service period and each of the contingency periods by applying a threshold for the average failure rate associated with the storage devices in the array to the corresponding cluster limit as shown for each period in table 500B. Such a failure rate threshold may be determined by experiment or by using any of various computational techniques as desired for a particular implementation. For purposes of the example as shown in FIG. 5B, it is assumed that the failure rate threshold is 75%. Thus, the target wear rate for the service period as shown in table 500B is equivalent to 0.36, or 75% of the 0.48 cluster limit of the service period.

The rightmost column of table 500B in FIG. 5B, labeled "Wear Rate On Chart," notes the value of the total transfer or wear rate 230 for the service period and each of the contingency periods as shown in the plot graph 400 of FIG. 4. As shown in table 500B, the values of the wear rate 230 for the service period (402 in FIG. 4) and the workload change period (404 in FIG. 4) exceed their target wear rates, i.e., 0.36 and 0.45, respectively.

Figure 6:
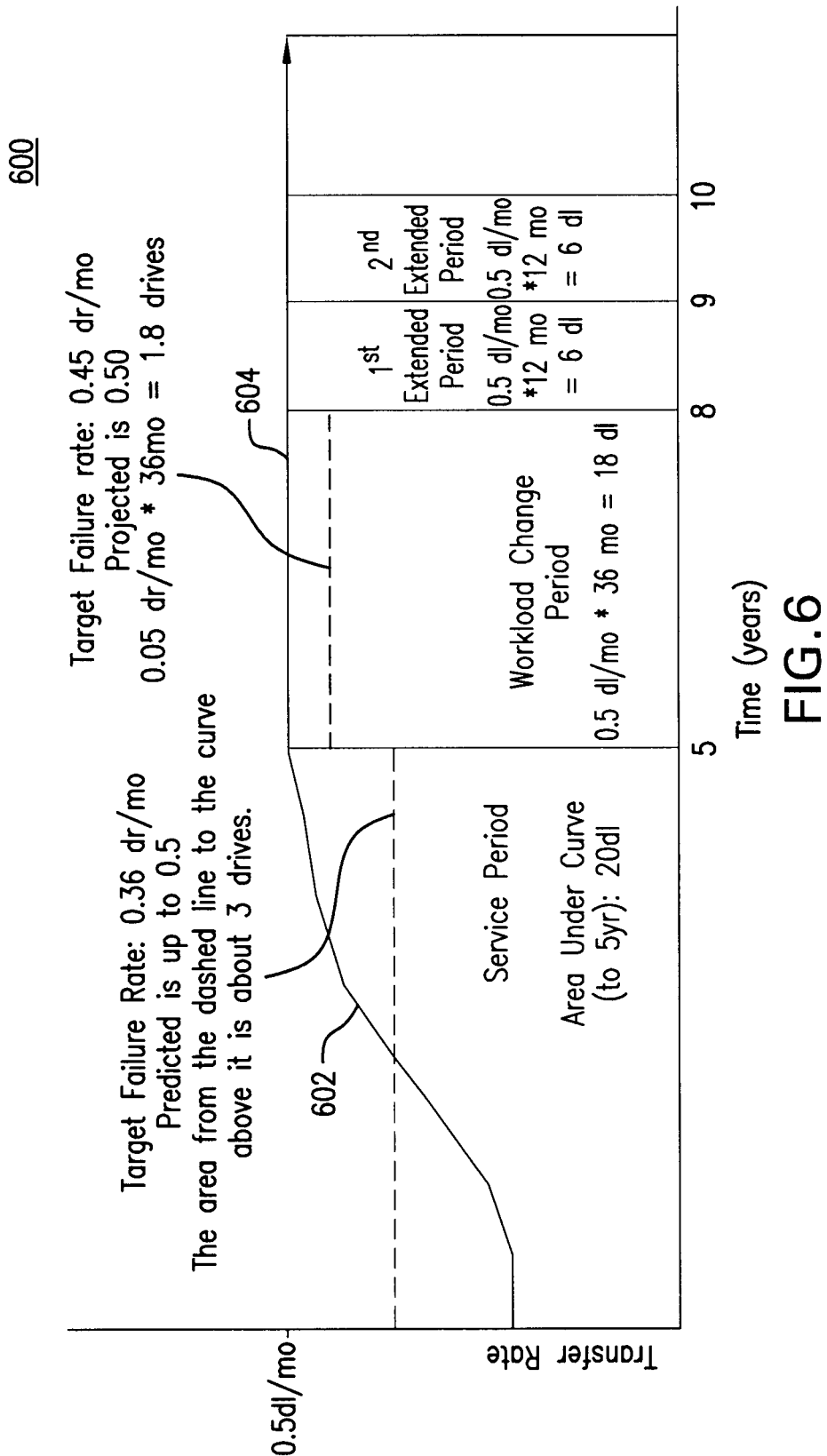
FIG. 6 is a plot graph illustrating the expected wear rate relative to a target wear rate for the array of storage devices over the service period and each of the various contingency periods following the service period, according to aspects of the present disclosure.

FIG. 6 is a plot graph 600 illustrating the expected wear rate relative to the target wear rate for the service period and each of the various contingency periods. The target wear rate for each period is indicated by the dashed lines in the plot graph 600. As shown in FIG. 6, the expected wear rates 602 and 604 for the service period and the workload change period, respectively, exceed the corresponding target wear rates. This indicates a violation of the specified risk tolerances for these periods. In an embodiment, the expected wear rate for the array of storage devices may be adjusted to match the target wear rate in response to determining that the expected wear rate exceeds the target wear rate calculated for these periods. For example, such a wear rate adjustment may involve, for example, replacing drives at a rate approximately equal to the rate of wear or letting the array's remaining service life run down without any replacements. In an embodiment, the adjusted expected rate may be used to generate a replacement schedule for the storage devices in the array over the array's remaining service life, as shown in FIG. 7.

Figure 7:
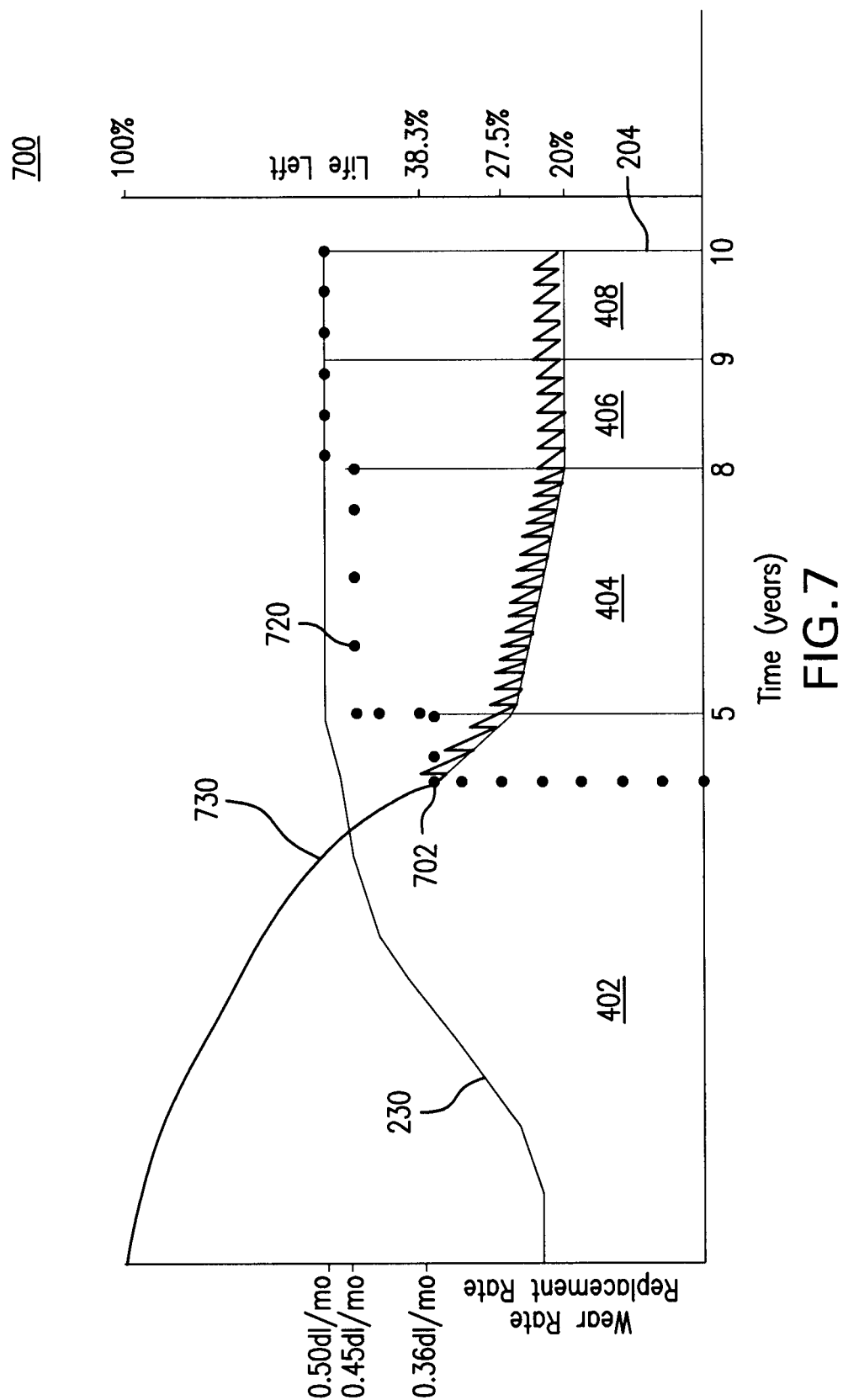
FIG. 7 is a plot graph illustrating the expected wear rate and an optimized replacement rate relative to a remaining service life estimated for the array of storage devices over the service period and each of the various contingency periods following the service period, according to aspects of the present disclosure.

FIG. 7 is a plot graph 700 illustrating the expected wear rate 230 relative to an optimal or target replacement rate 720 for the array of storage devices over the array's remaining service life including the service period 402 and each of the various contingency periods 404, 406, and 408. In an embodiment, the target replacement rate 720 may be based on a replacement schedule for the storage devices in the array. The replacement schedule may be generated based on the target wear rate that is calculated for each period by adjusting the expected wear rate, e.g., using the failure rate threshold and corresponding cluster size limit, as described above with respect to FIG. 5B. Accordingly, the target replacement rate 720 for each period as shown in FIG. 7 may be equivalent to the adjusted or target wear rate. As shown in FIG. 7, the drive replacement schedule in this example may involve running down a remaining endurance or service life 730 of the array until the life left reaches a point 702 that in this example is slightly before the end of the service period. This point may also mark the beginning of the replacement schedule for storage devices or drives in the array over the array's remaining service life.

The derivation of the remaining service life 730 may be best understood in reverse order, i.e., from the end of the timeline in the rightmost portion of the plot graph 700 to the start of the timeline in the leftmost portion of the plot graph 700. As shown in FIG. 7, the end of the remaining service life 730 may correspond to its lowest permissible value, the terminal state 204 of 20% life left, at the end of the second extended period 408. The smooth portion of the trend line for the remaining service life 730 in the plot graph 700 to the left of the terminal state 204 is flat or horizontal so long as the replacement rate 720 matches the expected wear rate 230, as shown in the first and second extended periods 406 and 408. However, during the workload change period 404 and the latter portion of the service period 402, the replacement rate 720 is less than the wear rate 230, resulting in a sloped trend line for the remaining service life 730, as more life is consumed in each of these periods than what is replaced.

It may also be noted that beginning at point 702, the trend line for the remaining service life 730 has both a smooth portion and a portion with a sawtooth pattern. The beginning of the sawtooth pattern and the frequency of its spikes are a consequence of the nonzero replacement rate 720. Each spike in the sawtooth line indicates a drive replacement and the resulting increase in overall life left.

The replacement rate 720 in this example progressively increases over each contingency period after the service period in accordance with the increasing wear rates and risk tolerances. The replacement schedule with the varying replacement rate 720 for each period may continue over the array's service life until the terminal state 204 is reached at the end of the service life. As described above and as shown in FIG. 7, the terminal state 204 for the array of storage devices may coincide with a point in time where an average remaining service life of the array is at a specified threshold, e.g., 20% of the total service life. In an embodiment, the duration of the contingency periods along with the corresponding expected and target wear rates thereof are adjusted periodically as the remaining service period or service time left gets shorter.

Figure 8:
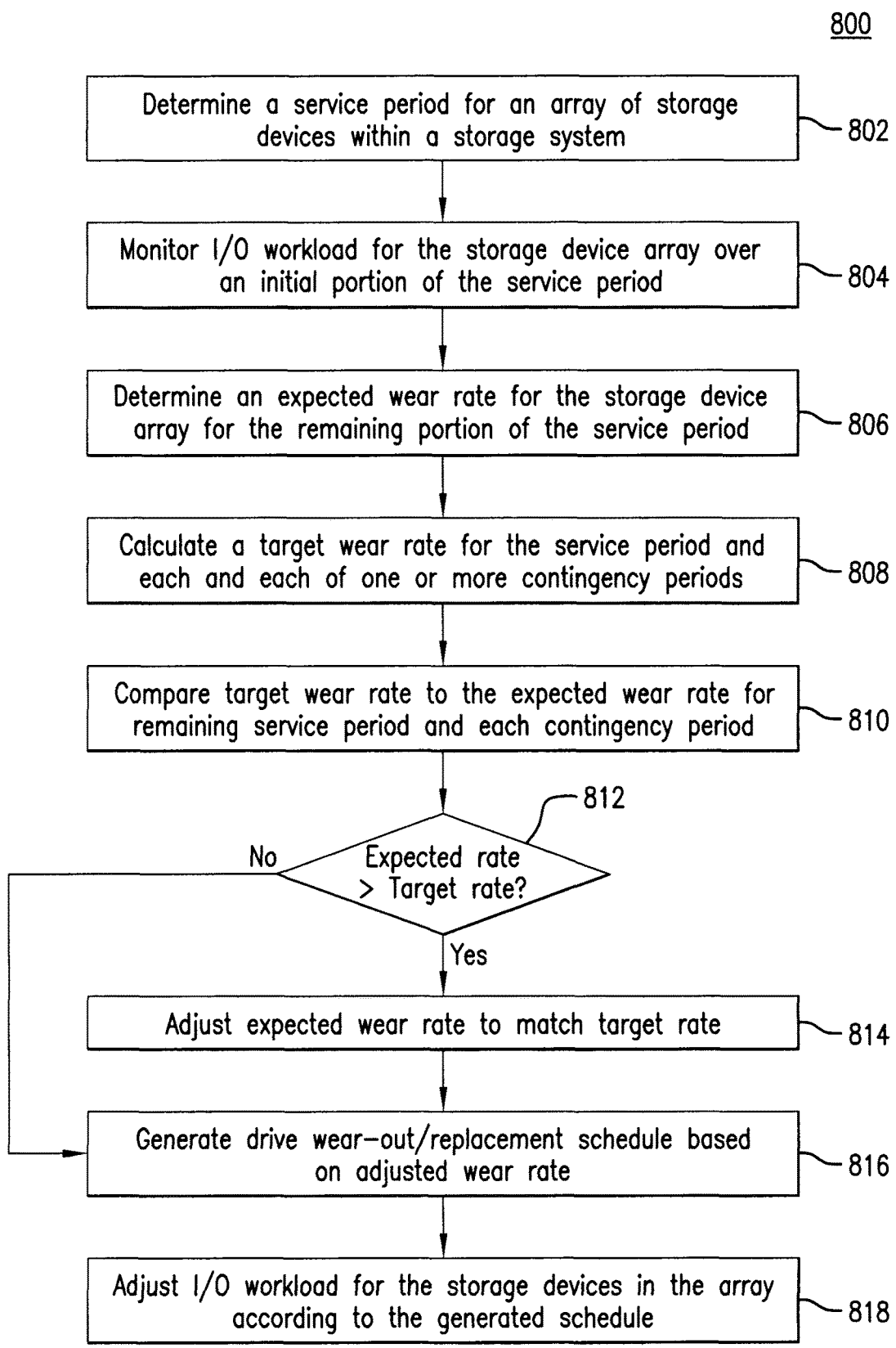
FIG. 8 is a flow diagram of a method of optimizing the estimation and management of wear and replacement for storage devices in a storage system based on storage device parameters and specified risk tolerances, according to aspects of the present disclosure.

FIG. 8 is a flow diagram of a method 800 of optimizing the estimation and management of wear and replacement for storage devices in a network storage system based on storage device parameters and specified risk tolerances, according to aspects of the present disclosure. Such storage device parameters may include, for example, the particular configuration of the storage devices in the array as well as the array's I/O workload over time. In the description of FIG. 8, reference is made to the different computer systems (e.g., storage controllers 108, server 114, and host 104) of FIG. 1, as described above, for purposes of illustration. However, method 800 is not intended to be limited thereto, and it is understood that other computer systems may be configured to perform the same functions when performing a pertinent requested operation. In an embodiment, the method 800 may be implemented by one or more processors of the computer systems, executing computer-readable instructions to perform the functions described herein. It is understood that additional steps can be provided before, during, and after the steps of method 800, and that some of the steps described can be replaced or eliminated for other embodiments of the method 800.

At block 802, the computer system determines a service period for an array of storage devices (e.g., storage devices 106 of FIG. 1, as described above) within a storage system. In one example, the actions of block 802 may include a human user manually entering service periods for different storage device hardware into a configuration GUI or other tool. In another example, at configuration, and administrator may enter serial numbers, model numbers, or other appropriate information into a configuration tool, and the configuration tool uses a network connection to access data for service life. In another example, the operations performed at of block 802 may be dictated by a Service Level Agreement (SLA) as described above. In any event, in many instances, service life may be specified by manufacturer according to model number of a particular piece of storage hardware.

At block 804, the computer system monitors a workload of I/O operations over an initial portion of a service period for the array of storage devices.

At block 806, the computer system determines an expected wear rate for the array of storage devices for a remaining portion of the service period. The expected wear rate may be determined based on the monitored workload and an endurance of the storage devices in the array, as described above. The determination of the expected wear rate may also be based on user input related to the workload. For example, the user may indicate an intention to do a bulk load of data onto the storage system, e.g., when first placing the storage system into service, and/or to perform a bulk export of data off the system, e.g., shortly before removing the system from service. If such input is not available, the computer system may attempt to detect such activities or predict their likelihood of occurrence based on the monitored workload from block 804.

At block 808, the computer system calculates a target wear rate for the array of storage devices for the remaining portion of the service period and each of one or more contingency periods. The target wear rate may be calculated based on the expected wear rate and a specified risk tolerance for each period. Risk tolerances may be fixed, dictated by SLA, or based on input from an administrator of the storage system. As described above, the one or more contingency periods extends the expected wear rate of the array of storage devices past the service period to a terminal state at an end of the array's remaining service life.

At block 810, the computer system compares the target wear rate to the expected wear rate for the remaining service period and each contingency period. At decision block 812, it is determined whether or not the expected wear rate exceeds the target wear rate calculated for the remaining portion of the service period or any of the one or more contingency periods.

If it is determined at block 812 that the expected wear rate exceeds the target wear rate for at least one of the periods, then method 800 proceeds to block 814. At block 814, the computer system adjusts the expected wear rate for the array of storage devices to match the target wear rate. Otherwise, the method 800 proceeds directly to block 816, at which the computer system generates a wear-out and replacement schedule for storage devices in the array over the array's remaining service life, based on the adjusted wear rate. Such a schedule may provide, for example, optimal timings for replacing storage devices within the array given the specified risk tolerances for unexpected changes to the wear rate as described above. To achieve such an optimal replacement schedule, the I/O workload for the storage device array may need to be adjusted such that the actual wear rate for the array of storage devices matches the adjusted wear rate.

Accordingly, at block 818, the computer system adjusts the I/O workload of the storage devices in the array according to the generated schedule. For example, the computer system may move the majority of the array's workload to a selected group of storage devices within the array such that the wear rate of these devices matches the replacement schedule (e.g., the replacement schedule 720 of FIG. 7, as described above). This allows the computer system to manage the workload across the array of storage devices such that the storage devices in the array as a whole trend towards consuming their endurance life according to a schedule matching the schedule generated at block 816.

In an embodiment, the computer system may use a dynamic weighting scheme to adjust workload allocations for individual storage devices within the array. For example, the computer may assign different weights to each storage device in order to increase or decrease the allocated workload for the device, e.g., where a device that is assigned a relatively higher weight is allocated a relatively larger percentage of the workload. Thus, the devices in the selected group described above may be assigned relatively higher weights for purposes of increasing their workloads relative to other devices in the array.

Various embodiments may add, omit, rearrange, or modify one or more of the actions in method 800. For instance, other embodiments may include an action for displaying a replacement schedule, a target wear rate, and expected wear rate, or other appropriate information to a human user at a display device of the computing system. The human user may use the information as a trigger to replace storage hardware or to take other actions in response thereto.

As a result of the elements discussed above, embodiments of the present disclosure improve upon storage system technology. For example, the disclosed data management techniques allow a storage system to estimate and manage wear and replacement rates for an array of storage devices within the system. Further, the disclosed techniques improve the storage system's performance by enabling optimal device replacement schedules to be generated based on specified risk tolerances for changing wear rates at critical time periods over the array's remaining service life. As such techniques are implemented directly within the storage controller's firmware, performance improvements can be achieved while maintaining backward compatibility with existing host systems.

In some embodiments, the computing system is programmable and is programmed to execute processes including the processes of method 800 of FIG. 8, as described above. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   monitoring a workload of input/output (I/O) operations over an initial portion of a service period for an array of storage devices within a storage system;
   determining an expected wear rate for the array of storage devices for a remaining portion of the service period, based on the monitored workload and an endurance of storage devices in the array;
   calculating a target wear rate for the array of storage devices for the remaining portion of the service period and each of one or more contingency periods, based on the expected wear rate and a specified risk tolerance for each period, the one or more contingency periods extending the expected wear rate of the array of storage devices past the service period to a terminal state at an end of the array's remaining service life;
   in response to determining that the expected wear rate exceeds the target wear rate calculated for at least one of the remaining portion of the service period and the one or more contingency periods, calculating an adjusted wear rate for the array of storage devices to match the target wear rate in accordance with the determination; and
   generating a replacement schedule for storage devices in the array over the remaining service life, based on the adjusted wear rate.

2. The method of claim 1, wherein the expected wear rate corresponds to an expected replacement rate for the array of storage devices within the array, and the adjusted wear rate corresponds to a target replacement rate for the storage devices.

3. The method of claim 1, wherein the I/O operations include at least one of: host-initiated I/O operations, garbage collection I/O operations, or reconstruction IO operations.

4. The method of claim 3, wherein the monitoring comprises: measuring a total data transfer rate for the array of storage devices based on the host-initiated I/O operations and the garbage collection I/O operations.

5. The method of claim 1, wherein a total duration of the remaining portion of the service period and the one or more contingency periods represents a total remaining service life of the array of storage devices.

6. The method of claim 5, wherein each of the one or more contingency periods represents a level of risk for a different type of contingency that affects the total remaining service life of the array of storage devices.

7. The method of claim 5, wherein a duration of one of the contingency periods is based on a remaining portion of the service period and a specified weighting for risk tolerance.

8. The method of claim 5, wherein a duration of one of the contingency periods is a fixed period of time representing a normal distribution of wear that extends beyond a point following the service period.

9. The method of claim 5, wherein one of the contingency periods accounts for unexpected changes to the workload of the array of storage devices, and a duration of the one of the contingency periods is determined based on the workload monitored over the initial portion of the service period and a maximum workload capacity associated with the remaining portion of the service period.

10. The method of claim 9, wherein the maximum workload capacity is based on at least one of a maximum performance limit of the storage devices in the array or a service-level agreement between a storage system operator and one or more hosts for which data services are provided by the storage system operator via the network storage system.

11. A non-transitory machine readable medium having stored thereon instructions for performing a method comprising machine executable code which when executed by at least one machine, causes the machine to:
   monitor a workload of input/output (I/O) operations over an initial portion of a service period for an array of storage devices within a storage system;
   determine an expected wear rate for the array of storage devices for a remaining portion of the service period, based on the monitored workload and an endurance of storage devices in the array;
   calculate a target wear rate for the array of storage devices for the remaining portion of the service period and each of one or more contingency periods, based on the expected wear rate and a specified risk tolerance for each period, the one or more contingency periods extending the expected wear rate of the array of storage devices past the service period to a terminal state at an end of the array's remaining service life;
   determine that the expected wear rate exceeds the target wear rate calculated for at least one of the remaining portion of the service period and the one or more contingency periods;
   calculate an adjusted wear rate for the array of storage devices to match the target wear rate in accordance with the determination; and
   generate a replacement schedule for storage devices in the array over the remaining service life, based on the adjusted wear rate.

12. The non-transitory machine readable medium of claim 11, wherein the expected wear rate corresponds to an expected replacement rate for the array of storage devices within the array, and the adjusted wear rate corresponds to a target replacement rate for the storage devices.

13. The non-transitory machine readable medium of claim 11, wherein the I/O operations include at least one of host-initiated I/O operations, garbage collection I/O operations, or reconstruction I/O operations.

14. The non-transitory machine readable medium of claim 13, further comprising machine executable code that causes the machine to: measure a total data transfer rate for the array of storage devices based on the host-initiated I/O operations and the garbage collection I/O operations.

15. The non-transitory machine readable medium of claim 11, wherein a total duration of the remaining portion of the service period and the one or more contingency periods represents a total remaining service life of the array of storage devices.

16. The non-transitory machine readable medium of claim 15, wherein each of the one or more contingency periods represents a level of risk for a different type of contingency that affects the total remaining service life of the array of storage devices.

17. The non-transitory machine readable medium of claim 15, wherein a duration of one of the contingency periods is based on a remaining portion of the service period and a specified weighting for risk tolerance.

18. The non-transitory machine readable medium of claim 15, wherein the duration of one of the contingency periods is a fixed period of time representing a normal distribution of wear that extends beyond a point following the service period.

19. The non-transitory machine readable medium of claim 15, wherein one of the contingency periods accounts for unexpected changes to the workload of the array of storage devices, and a duration of the one of the contingency periods is determined based on the workload monitored over the initial portion of the service period and a maximum workload capacity associated with the remaining portion of the service period.

20. A computing device comprising:
a memory containing machine readable medium comprising machine executable code having stored thereon instructions for performing a method of estimating and managing wear and replacement for storage devices in a storage system; and
a processor coupled to the memory, the processor configured to execute the machine executable code to cause the processor to:
monitor a workload of input/output (I/O) operations over an initial portion of a service period for an array of storage devices within the storage system;
determine an expected wear rate for the array of storage devices for a remaining portion of the service period, based on the monitored workload and an endurance of storage devices in the array;
calculate a target wear rate for the array of storage devices for the remaining portion of the service period and each of one or more contingency periods, based on the expected wear rate and a specified risk tolerance for each period, the one or more contingency periods extending the expected wear rate of the array of storage devices past the service period to a terminal state at an end of the array's remaining service life;
determine that the expected wear rate exceeds the target wear rate calculated for at least one of the remaining portion of the service period and the one or more contingency periods;
calculate an adjusted wear rate for the array of storage devices to match the target wear rate in accordance with the determination; and
generate a replacement schedule for storage devices in the array over the remaining service life, based on the adjusted wear rate.

* * * * *